United States Patent [19]

Trentelman et al.

[11] 4,389,317
[45] Jun. 21, 1983

[54] PROCESS FOR CHEMICAL REDUCTION OF THE PHOSPHATE CONTENT OF WATER

[75] Inventors: Christiaan C. M. Trentelman; Johannis C. van Dijk, both of Leusden; Johannes H. C. M. Oomen, Amersfoort, all of Netherlands

[73] Assignee: DHV Raadgevend Ingenieursbureau BV, Netherlands

[21] Appl. No.: 262,419

[22] Filed: May 11, 1981

Related U.S. Application Data

[63] Continuation of Ser. No. 39,593, May 16, 1979, abandoned.

[30] Foreign Application Priority Data

May 18, 1978 [NL] Netherlands ..................... 7805358

[51] Int. Cl.³ .......................... C02F 1/52; B01D 9/02
[52] U.S. Cl. ................................. 210/715; 210/906; 23/301; 23/313 FB
[58] Field of Search .............. 210/906, 714, 715, 661, 210/683, 702, 807; 23/301, 304, 313 FB; 423/158

[56] References Cited

U.S. PATENT DOCUMENTS

| | | | |
|---|---|---|---|
| 3,716,484 | 2/1973 | Lincoln et al. | 210/906 |
| 3,855,125 | 12/1974 | Lin | 210/906 |
| 3,965,002 | 6/1976 | Magnusson | 210/714 |
| 4,046,683 | 9/1977 | Tsunoda et al. | 210/906 |
| 4,145,282 | 3/1979 | Bruckenstein | 210/714 |

FOREIGN PATENT DOCUMENTS

| | | | |
|---|---|---|---|
| 1501912 | 10/1967 | France | 210/715 |
| 51-26752 | 3/1976 | Japan | 210/906 |

Primary Examiner—Benoît Castel
Attorney, Agent, or Firm—Kane, Dalsimer, Kane, Sullivan and Kurucz

[57] ABSTRACT

Heterogenous nucleation on a seed material is promoted in the removal of phosphate from water by contacting the water with the seed material in a bed of grains of the seed material which bed is fluidized and kept in fluidization by the water stream itself, while the introduction of the reagent or reagents is effected so as to have a substantially complete heterogenous nucleation take place on the seed material.

2 Claims, 2 Drawing Figures

PROCESS FOR CHEMICAL REDUCTION OF THE PHOSPHATE CONTENT OF WATER

This is a continuation of application Ser. No. 39,593, filed May 16, 1979, now abandoned.

BACKGROUND OF THE INVENTION

The invention relates to a process for chemical reduction of the phosphate content of water by adding at least one reagent which forms a crystalline difficultly soluble salt, and contacting the liquid with a seed material promoting the crystallization.

Processes of this kind are known. They are particularly used in the purification of waste water.

Both the municipal and the industrial waste water are nowadays purified biologically on a large scale, and the phosphate is thereby removed only to a limited extent. However, the disposal of this purified waste water still containing appreciable amounts of phosphate may give rise to a promotion of the growth of algae in the water stream in which it is disposed. Therefore it is often desirable to reduce the phosphate content of the biologically purified waste water still further, before it is drained.

The present state of the waste water purification art encompasses three chemical processes for the reduction of the phosphate content, which are classified according to the location in the purification process, where the reagents are dosed, to wit:

pre-precipitation, whereby the reagents are introduced and the precipitate obtained is removed before the start of the biological purification, simultaneous precipitation, whereby the reagents are introduced during the biological purification and the precipitate is removed together with the biological sludge, and post-precipitation, whereby the reagents are added and the precipitate obtained is removed after completion of the biological purification.

In practice iron and aluminum salts are frequently used as reagents for the phosphate removal. These salts have the disadvantage that large amounts of extraneous anions (sulphate or chloride) are introduced into the water, thus increasing the salt content thereof. Moreover, these metals remain in the obtained sludge, which reduces the agricultural value of the sludge to practically zero.

These disadvantages do not adhere to the use of lime as a reagent for the removal of phosphate. Until recently, however, the lime precipitation was almost exclusively executed as a pre-precipitation. Then a high pH must be used, so that a simultaneous conditioning of the water takes place, which accordingly produces large amounts of additional sludge. Also it is not allowed to remove all phosphate from the water, since some of the phosphate content is used in the biological purification for the cultivation of the biological cell material. Therefore the reaction with the lime should be controlled carefully, which has been shown in practice to be difficult.

In the simultaneous precipitation method lime can be used, too. Thereby the starting point was an investigation of Jenkins. Menar and Ferguson, described in Applications of New Concepts of Physical-Chemical Wastewater Treatment 1972, pages 211–230. From this investigation it follows that at a relatively low pH an appreciable amount of phosphate may precipitate as hydroxyapatite ($Ca_5(PO_4)_3OH$). Prerequisite for obtaining chemical equilibrium in a reasonably short time is that there is present in the reactor a sufficient amount of already formed apatite crystals.

In practice, however, it appeared that although by dosing the lime in the biological step of the purification a substantial increase in the phosphate removal could be secured, the residual amount of phosphate in the water was still higher than desirable and that appreciable amounts of calcium carbonate were formed owing to conditioning of the water.

All processes of phosphate removal used up till now, in which a lime-phosphate-precipitate was formed, have in common that always a sludge is formed of the difficultly soluble phosphates. To be true, in the simultaneous precipitation with lime mention is made of formed apatite crystals, but the dimensions of these crystals are so minute, that they can be hardly if ever distinguished from the biological sludge. This means that the apparatus which is known to this end is bulky and expensive, since the obtained precipitate can only be removed by sedimentation and/or filtration, while moreover large amounts of sludge are produced having a high water content of 95 percent or more. Especially the formation of large amounts of sludge is nowadays seen everywhere as a serious problem, since the disposal of the sludge becomes increasingly more difficult.

BRIEF DESCRIPTION OF THE INVENTION

It was now found that it is possible to obtain coarsely crystalline granular material with a low water content in the removal of phosphate from water by formation of an insoluble crystalline calcium-phosphate-compound.

Thus the invention provides a process for chemical reduction of the phosphate content of water by adding at least one reagent which forms a crystalline difficultly soluble salt, and contacting the liquid with a seed material promoting the crystallisation, characterized in that the contacting takes place in a bed of grains of the seed material promoting the crystallisation fluidized and kept in fluidization by the water stream, and that the introduction of the reagent or reagents is effected so as to have a substantially complete heterogenous nucleation take place on the seed material.

The invention is based on the application of a fluidized bed of a material, which promotes the crystallization of the calcium-phosphate-compound or compounds.

Generally a fluidized bed may be obtained by passing a fluid stream upwardly through a bed of solid particles. To begin with this bed will be a fixed bed. While passing the fluid with a very low velocity through the bed, the particles will not move and the bed will remain a fixed bed, since the openings between the grains of the bed are large enough for accomodating the small amounts of liquid. Increasing the current through the bed will, however, increase the pressure differential over the height of the bed. As soon as this pressure differential will be equal to the apparent weight of the bed, the situation changes. Then the bed begins to fluidize. The current velocity at which this fluidization starts, is called the minimum fluidization velocity $U_{mf}$.

When the current velocity increases above the minimum fluidisation velocity, the expansion of the bed will increse, but the pressure differential over the height of the bed will remain constant, that is equal to the apparent weight of the bed. On expansion the porosity of the bed increases proportionally.

Finally the current velocity reaches such values, that the smallest particles in the bed do no longer fall back into the bed, but are carried away with the stream. Then the pressure differential begins to increase again with the current velocity. When even the largest particles of the bed are carried away with the stream, the fluidized bed does no longer exist.

The velocity at which the particles are carried away by the stream can be calculated approximately. So it appears that for a material with a density of $2.6 \times 10^3$ kg/m$^3$ and a water current velocity of 100 m/h particles with a diameter of less than about 0.14 mm will be carried away. Particles which are too large cannot be fluidized, not even with the highest practical velocities. For obtaining a fluidized bed suitable to the present purpose it appears that the particle size should range from 0.1 to 3 mm diameter.

Also the height of the fluidized bed is important in this respect. The height of the fixed bed, from which the fluidized bed is obtained, may range from about 1 to about 4 m. In order to obtain the full advantages of a fluidized bed it is preferred to use superficial current velocities of at least 3 m/h.

Although it is possible to introduce the reagent or the reagents into the water before it enters into the reactor with the fluidized bed, a localized too strongly supersaturated condition of the calcium-phosphate-compound can arise, causing nucleation in the liquid phase in stead of on the seed material.

Thus it is advantageous to inject the reagent or the reagents into the fluidized bed itself. By this a too strong supersaturation in the reactor is avoided, since part of the calcium and phosphate ions will crystallize instantaneously on the inoculation material.

However, under certain circumstances an amorphous precipitate may arise, causing the water issuing from the reactor to be turbid, if all of the regent necessary for the crystallization is introduced into the fluidized bed directly at or before the entrance of the reactor. In those cases it is necessary to inject only a part of the necessary amount of reagent at or before the entrance of the reactor, while the remaining part or parts are injected in the upper strata of the fluidized bed.

It is also possible to use two or more fluidized beds in series, in which the injection of the reagent always takes place directly at or before the entrance of the fluidized bed.

The invention also provides an apparatus for chemical reduction of the phosphate content of water by adding at least one reagent which forms a crystalline difficulty soluble salt, and contacting the liquid with a seed material promoting the crystallization, with a reaction vessel, perpendicular in operation, with below an inlet for crude water and an outlet for the grains comprising the seed material and the calcium-phosphate-compounds crystallized thereon, and above an outlet for treated water, as well as an inlet for reagent, characterized in that at different heights above the reactor bottom reagent spray-nozzles have been provided.

If the reactor is operated with crude water of a more or less fluctuating composition, it may be of advantage to be able to dispose of spray nozzles with adjustable height. Correspondingly a preferred embodiment of the apparatus is characterized in that the reagent spray nozzles are adjustable in height above the reactor bottom.

BRIEF DESCRIPTION OF THE DRAWINGS

The invention is now further explained with reference to the drawings.

Therein

DETAILED DESCRIPTION OF THE INVENTION

Figure 1:
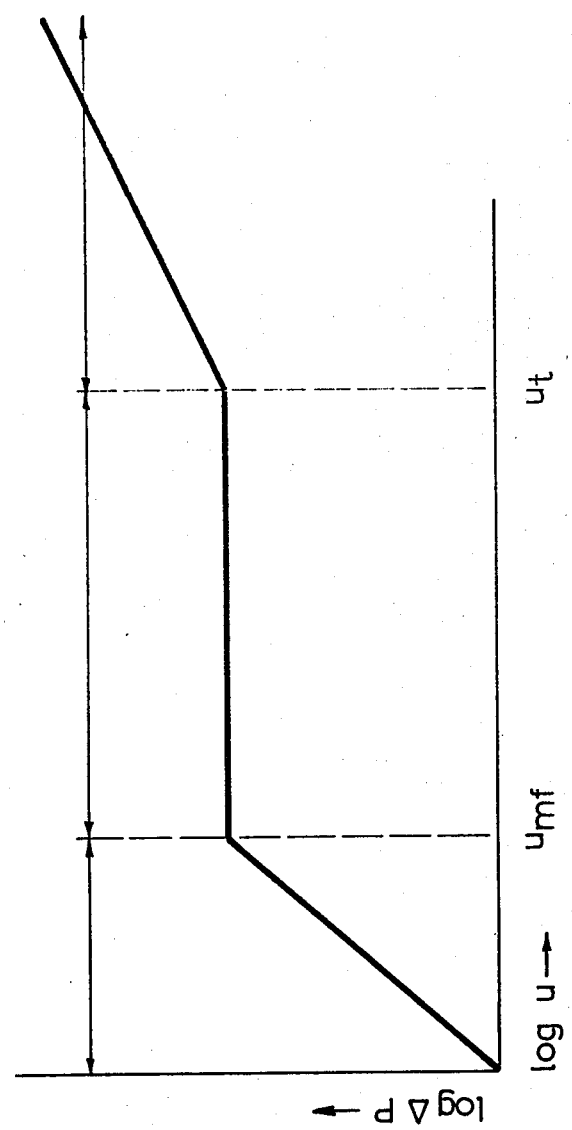
FIG. 1 is a diagram of the pressure differential over a particle bed as a function of the current velocity through the bed.

FIG. 1 represents a diagram representing the conditions which govern the development of a fluidized bed. To this end it is necessary that the current velocity through a bed of undetached grains is at least as great as the minimum fluidization velocity. Undetached particles are particles in which the interaction forces (London-VanderWaals interaction) are negligible with respect to the weight of the individual particles. To this end the particles should have a minimum size of about 0.1 mm diameter.

In known sludge or precipitation processes the particle size is an order of magnitude less. In such methods a fluidized bed is therefore impossible.

In the present process superficial water current velocities of 40 m/h or more can be easily reached, but in sludge methods velocities of no more than 1 to a few m/h may be attained. In these methods fluidization is impossible, also because the interaction forces between individual particles are not negligible with respect to the weight of the particles.

The advantages of operating a fluidized bed are the following:

1. Obstruction of the bed caused by accretion of grains is avoided actively,
2. the available solid contact surface is very high, so that the desired result is obtained in a short residence time period in the reactor, thus allowing to choose a reactor of a comparatively small size,
3. the grains may increase in size to coarse grains of some few mm, being almost free of water, and
4. since the reaction in the flidized bed is effected with a substantially complete heterogenous nucleation, no separate post purification is necessary.

The reaction kinetics of the process are so favourable, that at a relatively low pH (8.5–9.5) an extreme removal of phosphate (up to $\leq 1$ ppm) is obtained in relatively short reaction time periods (less than 3 minutes).

Besides this a very important advantage is that a granular product is obtained with a very low water content (about 0.5 percent) for which several industrial and agricultural applications can be found.

Thus, not only is the volume of the produced grains in the process according to the invention roughly a factor 50 lower than in the present prior art processes, which is in itself already very important in view of marketing possibilties, but also the nature in which the product is available (a granular and especially dry product compared with a sludge with a high water percentage) has important advantages over the present prior art processes. Finally the purity of the obtained product is much greater than in the sludge processes, too, which strongly increases the possibilities for a useful application.

Alkaline lye is considered in the first place for a reagent. If only alkaline lye is used, then crysals arise of a calcium-phosphate-hydroxycompound. However, it is also possible to produce crystals of a calcium-phosphate-fluoride compound. To this end a fluoride is added to the alkaline lye, for instance, sodium fluoride. This fluoride may also be injected separately in the liquid current.

Important for obtaining good results is also that the chemical composition of the crude water is brought within predetermined limits. On the one side the solution should be supersaturated with respect to the product which is to be obtained, otherwise no crystallization will take place. On the other side this supersaturation may not grow to an extent whereby homogeneous nucleation in the liquid phase will take place besides the heterogenous nucleation. Important criteria are thereby:

1. The calcium ion concentration. In natural water and in waste water there is generally present so much calcium ion, that no separate additions are necessary. Nevertheless it is sometimes necessary to increase the calcium ion concentration. This is usually done by addition of lime or calcium salts (for instance $CaCl_2$).

2. Although the phosphate ion concentration of the crude water to be treated is a given parameter, it may be necessary to decrease this concentration for attaining a proper functioning. This may be effected by recirculation of dephosphated reactor effluent to the entrance of the reactor.

3. In all cases the pH must be raised. Therefore an alkaline lye is always necessary as a reagent. It may be necessary to divide the amount of alkali over a number of injection sites, such in view of the necessity not to raise the supersaturation excessively.

4. The fluoride ion concentration is important if it is desired to produce a calcium-phosphate-fluoride product.

5. The concentration of other ions, like carbonate and sulphate.

The reagent used should comprise, tuned to the composition of the crude water which is used, at least one, but usually a combination of the following ions:
  1. hydroxyl ions
  2. fluoride ions
  3. calcium ions.

1. The alkaline lye to be added according to the process of the invention, may be an alkali metal hydroxide lye, especially the easily available caustic soda lye, as well as an alkaline earth metal lye, especially lime water. The use of caustic soda lye has advantages in small installations, since the apparatus for its production and its dosage is simple. For large to very large amounts of water in large installations, however, the use of lime water has advantages owing to the lower cost of lime, which then compensates for the higher inventments for the production and dosage apparatus.

2. As a source of fluoride ions NaF is considered in the first place, but other soluble fluorides can be applied, too.

3. As a source of calcium ions calcium chloride is considered besides lime, too.

It appeared that the reactions are so fast, that within some few minutes an extreme phosphate removal can be reached at a relatively low pH. Thereby it appeared that surprisingly the conditions can be chosen easily so as to preclude almost completely the formation of calcium carbonate, so that the added reagents are used almost exclusively in the desired reactions.

Because of the accretion of the crystalline phosphate on the grains of the fluidized bed these grains increase in size and weight and the weight of the bed increases. This causes the minimum fluidization velocity to rise, too. If this minimum fluidization velocity would have reached the value of the current velocity used, the fluidized bed would cease to exist. Therefore it is necessary to remove the largest particles periodically from below in the reactor. In order to keep the number of particles more or less constant in the reactor, new small particles are added in the upper region of the reactor.

Figure 2:
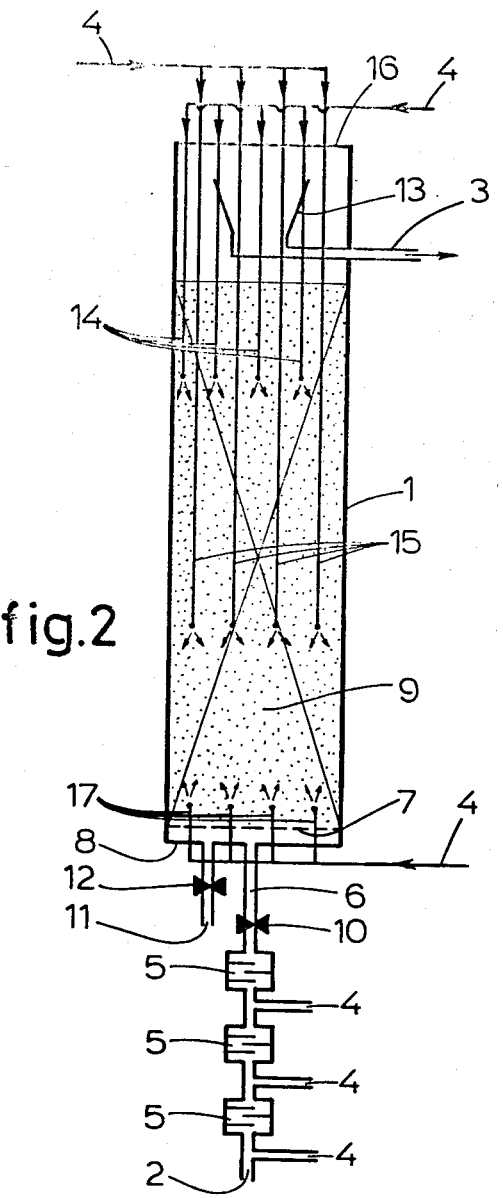
FIG. 2 is a schematical representation of an embodiment of an apparatus used to carry out the invention.

FIG. 2 of the drawing shows an embodiment of an apparatus used to carry out the invention. Therein a reaction vessel is indicated by 1, having a water feed duct 2, a water discharge duct 3 and reagent feed ducts 4. Behind each reagent feed duct 4 a mixing chamber 5 is incorporated in the water feed duct 2. The water which is mixed with the reagent or reagents enters the reactor 1 through the duct 6. It then flows through the distributing plate 7, which is provided just above the reactor bottom 8. The distributing plate 7 serves to distribute the water current over the complete width of the rector thus allowing to keep a homogeneous fluidized bed 9 of seed material promoting the crystallisation.

This fluidized bed 9 is kept in the reactor 1 and made from the grain filling present therein by virtue of the entering water current, the current velocity of which and thereby the height of the fluidized bed can be controlled by the valve 10 taken up into the duct 6. Incorporated into the reactor bottom is further still a discharge 11 for grains with a valve 12.

Advantageously it is possible to inject one or more of the reagents into the reactor itself by way of reagent spray nozzles 17.

In the upper region of the reactor an overflow funnel is mounted, which serves for the discharge of the treated water. This funnel debouches into the water discharge duct 3. In the reactor are mounted a number of lances 14 and 15 for one or more reagents 4, which empty themselves at different heights above the bottom into the fluidized bed 9. The distance between the end of the lances 14 and 15 and the cover 6 of the reactor 1 may be varied. Another embodiment of the reactor is obtained by omitting the lances 14 and 15. Usually, however, the water discharging from the reactor will then have a still too high phosphate content, so that one or more further reactors will have to be connected in series.

The invention is now further explained with reference to the following non-limiting examples.

EXAMPLE 1

In an apparatus according to FIG. 2 water with a phosphorus content of 17.5 mg/l was treated with 0.6 eq. NaOH-solution per m$^3$ water, while further 90 mg Ca$^{++}$ per liter of water was added. The lye dosage completely took place at the entrance of the reactor and the calcium dosage took place before the entrance of the reactor. The crystallization promoting material, which was used, was calcined and washed filter sand (grain fraction 0.2–0.6 mm). So much filter sand was added, that at a superficial velocity of 30 m per hour a fluidized bed arose with a height of 3 m. The Ca$^{++}$ ion content in the water amounted after the dosage to 124 mg/l and the HCO$_3^-$ ion content was 100 mg/l.

In continuous operation the phosphorus content of the water was decreased with this apparatus to 2.7 mg/l in the effluent. The pH of the dephosphated water obtained was 8.3, while the $Ca^{++}$ content was decreased to 100 mg/l.

EXAMPLE 2

In the same apparatus as in Example 1 water with a phosphorus content of 20 mg/l was treated with 1 eq. NaOH per m³ water, while further 85 mg $Ca^{++}$ per liter of water was added. The lye dosage completely took place at a height of 1.20 m above the reactor bottom, while the calcium dosage took place before the reactor. The crystallization promoting material was the same as in Example 1. The height of the bed was also 3 m at a superficial water current velocity of 30 m per hour. The $Ca^{++}$-ion content was after dosage 120 mg/l and the $HCO_3^-$ ion content was 100 mg/l. In the same way as in Example 1 the phosphorus content was reduced in a continuous operation to a value of 0.5 mg/l in the effluent, which had a pH of 9.2. The $Ca^{++}$-content of the water was reduced to 88 mg/l.

EXAMPLE 3

In the same apparatus as in Example 1 water which was purified in a waste water purification installation with a total phosphorus content of 15-19 mg/l (of which about 13-17 mg/l was present as ortho phosphate), a $Ca^{++}$ content of 40-60 mg/l and a $HCO_3^-$ ion content of 250 mg/l was treated with 1.25 eq. NaOH per m³ of water, while also 80 mg of calcium per liter of water were added. The lye dosage took place for 10 percent in the feed duct of the water and for 90 percent at a height of 1.20 m above the reactor bottom, while the calcium dosage took place before the reactor. The crystallization promoting material used was the same as in Example 1 and the operation took place at the same bed height and at the same current velocity as in Example 1.

In the effluent the total phosphorus content was reduced to 1.3 mg/l, of which 1.2 mg/l was ortho phosphate. The pH of the effluent was 9.2, while the $Ca^{++}$ content was decreased to 80–96 mg/l.

EXAMPLE 4

In the same apparatus as in Example 1 water which was purified in a waste water purification installation with an ortho phosphate content of 13 mg/l was treated with 1.25 eq. NaOH per m³ of water, 40 mg/l of calcium ions and 4 mg/l of fluoride ions. Dosage of the fluoride and calcium ions took place in the water fed into the reactor before its entrance into the reactor, whereas the lye dosage took place for 60 percent just above the distribution plate of the reactor and for the remaining 40 percent just above the distribution plate of a second reactor, which was connected in series with the first one. The use of the crystallization promoting material, the height of the bed and the current velocity were for both reactors the same as in Example 1.

In the effluent the ortho phosphate content was reduced to 1.2 mg/l.

We claim:

1. A process for the chemical reduction of the dissolved phosphate content of a stream of water containing the dissolved phosphate, which comprises;
   passing the stream of water at a velocity of from 30 to 200 m/h through a bed of seed grains, said seed grains ranging in size from 0.1 to 3 mm., whereby said bed of seed grain is fluidized by the passing stream;
   providing at least one reagent which will react with the dissolved phosphate to form crystals of a phosphate compound; and
   adding the provided reagent to the stream at several sites spread over the height of the fluidized bed;
   whereby granules of crystalline material are obtained by crystallization and build-up of said phosphate compound onto the seed grains, said granules being readily separated from the stream as virtually water-free granules.

2. A process according to claim 1, wherein the height of the fixed bed from which the fluidized bed is obtained is between about 1 and 4 m.

* * * * *

UNITED STATES PATENT AND TRADEMARK OFFICE
CERTIFICATE OF CORRECTION

PATENT NO. : 4,389,317
DATED : June 21, 1983
INVENTOR(S) : Christiaan C. M. Trentelman et al It is certified that error appears in the above—identified patent and that said Letters Patent is hereby corrected as shown below:

At Column 4, line 43, "flidized" should read -- fluidized --

At Column 4, line 48, "$\geq$1 ppm" should read -- $\leq$1 ppm -- .

At Column 4, line 67, "crysals" should read -- crystals --

At Column 5, line 53, "inventments" should read -- investments --

Signed and Sealed this

Twenty-first Day of February 1984

[SEAL]

Attest:

GERALD J. MOSSINGHOFF

Attesting Officer     Commissioner of Patents and Trademarks